United States Patent
Modena et al.

(10) Patent No.: US 8,674,260 B2
(45) Date of Patent: Mar. 18, 2014

(54) METHOD FOR PRODUCTION OF SAFETY/RUPTURE DISCS

(75) Inventors: Mario Modena, Milan (IT); Antonio Ruggero Sante Donadon, Settimo Milanese (IT)

(73) Assignee: Donadon Safety Discs and Devices S.R.L., Corbetta (IT)

( * ) Notice: Subject to any disclaimer, the term of this patent is extended or adjusted under 35 U.S.C. 154(b) by 230 days.

(21) Appl. No.: 13/187,673

(22) Filed: Jul. 21, 2011

(65) Prior Publication Data

US 2012/0012571 A1    Jan. 19, 2012

Related U.S. Application Data

(63) Continuation-in-part of application No. 12/663,622, filed as application No. PCT/IT2007/000433 on Jun. 18, 2007.

(51) Int. Cl.

| | |
|---|---|
| B23K 26/00 | (2006.01) |
| B23K 26/04 | (2006.01) |
| B23K 26/08 | (2006.01) |
| B23K 26/02 | (2006.01) |
| B23K 26/10 | (2006.01) |
| B29C 35/08 | (2006.01) |
| H05B 6/00 | (2006.01) |

(52) U.S. Cl.
USPC ............ 219/121.72; 219/121.61; 219/121.62; 219/121.68; 219/121.69; 219/121.8; 219/121.81; 219/121.71; 264/400; 264/482

(58) Field of Classification Search
USPC ............ 219/121.61, 121.62, 121.68, 121.69, 219/121.8, 121.81, 121.65–121.67, 219/121.71–121.72; 264/400, 482; 72/379.2, 54–62, 327, 379; 137/68.19–68.27; 52/98–100; 220/89, 220/89.1–89.2, 89 A; 280/737, 736; 29/421.1, 421.2

See application file for complete search history.

(56) References Cited

U.S. PATENT DOCUMENTS

| | | | | |
|---|---|---|---|---|
| 2,261,035 A | * | 10/1941 | Miller | 220/89.2 |
| 2,380,964 A | * | 8/1945 | Grover | 220/89.2 |
| 2,788,794 A | * | 4/1957 | Holinger | 137/71 |
| 3,109,554 A | * | 11/1963 | Porter et al. | 220/89.2 |
| 3,922,767 A | * | 12/1975 | Solter et al. | 29/890.141 |
| 4,072,160 A | * | 2/1978 | Hansen | 137/68.26 |
| 4,537,809 A | * | 8/1985 | Ang et al. | 428/42.2 |
| 4,597,505 A | * | 7/1986 | Mozley et al. | 220/89.2 |
| 4,655,070 A | * | 4/1987 | Clift | 72/325 |
| 4,734,550 A | * | 3/1988 | Imamura et al. | 219/121.77 |

(Continued)

FOREIGN PATENT DOCUMENTS

| | | |
|---|---|---|
| EP | 0867648 A2 | 9/1998 |
| EP | 1591703 A | 11/2005 |

(Continued)

*Primary Examiner* — Dana Ross
*Assistant Examiner* — Gyounghyun Bae
(74) *Attorney, Agent, or Firm* — Pearne & Gordon LLP

(57) ABSTRACT

A method for production of safety/rupture discs comprises the steps providing a foil element, selecting a wavelength for a laser beam of a pulse laser within a range of between 800 nanometers and 1800 nanometers, selecting a pulse repetition rate for the laser beam within a range of between 15 KHz and 800 KHz, selecting a pulse duration for the laser beam less than 10 nanosecond and ablating at least one non-through cut in the foil element by directly applying said laser beam to the foil element to remove material from the foil element thereby obtaining a safety/rupture disc.

9 Claims, 1 Drawing Sheet

(56) References Cited

U.S. PATENT DOCUMENTS

| | | | |
|---|---|---|---|
| 4,803,136 A * | 2/1989 | Bowsky et al. | 429/56 |
| 4,819,823 A | 4/1989 | Kadakia et al. | |
| 5,058,413 A * | 10/1991 | Muddiman | 72/379.2 |
| 5,246,530 A | 9/1993 | Bugle | |
| 5,267,666 A * | 12/1993 | Hinrichs et al. | 220/89.2 |
| 5,744,776 A * | 4/1998 | Bauer | 219/121.7 |
| 6,138,898 A * | 10/2000 | Will et al. | 228/157 |
| 6,337,461 B1 * | 1/2002 | Yasuda et al. | 219/121.62 |
| 6,446,653 B2 | 9/2002 | Cullinane et al. | |
| 6,551,542 B1 * | 4/2003 | Patel et al. | 264/400 |
| 6,621,040 B1 * | 9/2003 | Perry et al. | 219/121.67 |
| 6,717,101 B2 | 4/2004 | Morris et al. | |
| 7,000,942 B2 * | 2/2006 | Lutze et al. | 280/728.3 |
| 7,164,098 B2 | 1/2007 | Fukushima et al. | |
| 7,323,131 B2 * | 1/2008 | Lutze et al. | 264/482 |
| 7,596,862 B2 | 10/2009 | Egitto et al. | |
| 7,600,527 B2 * | 10/2009 | Shaw et al. | 137/68.27 |
| 7,870,865 B2 * | 1/2011 | Mattison | 137/68.25 |
| 7,919,036 B2 * | 4/2011 | Bauer et al. | 264/400 |
| 8,333,212 B2 * | 12/2012 | Shaw et al. | 137/15.18 |
| 2003/0085209 A1 | 5/2003 | Lu | |
| 2003/0230875 A1 * | 12/2003 | Lutze et al. | 280/728.3 |
| 2004/0089644 A1 * | 5/2004 | Sekiya | 219/121.72 |
| 2004/0226202 A1 | 11/2004 | Hillstrom et al. | |
| 2006/0231536 A1 * | 10/2006 | Griebel et al. | 219/121.71 |
| 2006/0237457 A1 | 10/2006 | Shaw et al. | |
| 2008/0000885 A1 * | 1/2008 | Kaplan et al. | 219/121.68 |
| 2008/0088064 A1 | 4/2008 | Jones et al. | |
| 2010/0140238 A1 * | 6/2010 | Mozley et al. | 219/121.72 |

FOREIGN PATENT DOCUMENTS

| | | | |
|---|---|---|---|
| GB | 2201464 A * | 9/1988 | F16K 17/40 |
| WO | 2008/155783 A1 | 12/2008 | |
| WO | 2010/068329 A1 | 6/2010 | |

* cited by examiner

METHOD FOR PRODUCTION OF SAFETY/RUPTURE DISCS

BACKGROUND OF THE INVENTION

The present invention relates to a method for production of safety/rupture discs, namely discs or dome-shaped elements having a pre-calculated breaking threshold.

In particular, the present invention is advantageously used in producing devices applied to plants along pneumatic or hydraulic lines to ensure the necessary safety measures of the plant itself which can be submitted to conditions different from the design ones.

More specifically, such devices are applied to emergency lines to fully close the duct on which they are applied.

A high-pressure fluid acts in one of the half-spaces defined by the device, while the opposite half-space is acted upon by a lower pressure, for example the atmospheric one.

Alternatively, the safety discs of known type can protect plants operating at sub-atmospheric pressure. In this case too, the device is submitted to a pressure difference acting between the two opposite faces of same.

When the difference between the pressure acting inside the plant and the external pressure exceeds a value of pre-calculated safety threshold, this disc opens by tearing and allows the fluid under pressure to go beyond the safety device so as to flow out of the plant. In this manner, a possible and undesirable pressure excess is not able to damage other parts of the plant.

In case of plants operating at a sub-atmospheric pressure, rupture of the safety disc enables the fluid under atmospheric pressure to flow into the plant.

Typically, the safety discs to which reference is made have a disc-shaped configuration with a surface on which the fluid under pressure acts, which surface can be flat, concave or convex.

Alternatively, said discs have a square or rectangular shape depending on the duct onto which they have to be applied.

The discs that do not have any frangible line of pre-established rupture, open in a non-definite manner with possible separation of some parts. For this reason, in many cases preferably discs with frangible lines of pre-established rupture are used, which lines can be obtained with notches or cuts of various shapes, which can be through cuts or not. In the case of through cuts a second continuous layer, weaker than the calibrated section is necessary, to ensure pneumatic and/or hydraulic tightness. When there are no through cuts this is not required.

At all events, these discs can have a plurality of non-through cuts disposed on a surface of the disc in a suitable configuration so as to define corresponding frangible lines of pre-established rupture.

In other words, when overcoming of the threshold value of the fluid pressure occurs, the safety disc tears at said frangible lines of pre-established rupture.

In the methods for producing these discs, particular attention must be paid exactly to the execution of said non-through cuts in terms of depth, length and width, but also as regards maintenance of the mechanical features of the disc material close to the non-through cuts. In particular, it is necessary for this material to keep its crystalline-metallurgic structure unchanged.

In fact, the non-through cut sizes are selected as a function of the value of the pre-established pressure threshold to which the disc must break. Undesirable mechanical alterations and/or alterations in the crystalline structure that on the other hand can be hardly evaluated, can modify this threshold value. In this manner, the safety disc starts operating before or after achievement of this value.

In known production methods, cuts are mainly made mechanically. In particular, cuts can be made by permanent set through use of punches and related counter-punches or moulds and counter-moulds.

Alternatively, cuts are made by micro-milling. In other words, a portion of the material is mechanically removed with great accuracy.

The described methods at all events involve use of tools coming into contact with the mentioned safety disc.

First of all, this type of working imposes reduced work speeds. In addition, similar production methods are expensive, without on the other end ensuring excellent accuracy levels.

Finally, the direct contact between the tools required for working, and the disc involves gradual decay of the tools that must be reground and/or replaced bringing about, as a result, production stops and impairing constancy in the discs produced at a later time. All that obviously affects costs and production.

To at least partly obviate the mentioned drawbacks, cutting methods are known that use a laser beam. In this type of method described in the US Patent Application No. 2006/0237457, the disc is previously covered with a layer of protective material. In this case, the laser beam traces the lines to be cut directly in the protective layer and not in the metal. The cuts are then actually made by an electrical-polishing process. Removal of the metal material takes place by an electrolytic method (electrical polishing). Finally, the protective material layer is removed.

However, this type of working involves very long work times and high production costs due to the indispensable requirement of applying and removing the protective layer.

The use of laser beam for directly machining the non-through cuts on the disc has been discussed in various publications in recent years. It has been well established that laser machining is a material removal process based on transportation of photon energy into the target material. This energy removes material by two physical effects: by melting the material or through direct vaporization or ablation.

Document US2006/0237457 discloses that using a laser beam directly on a disc for providing non-through cut is not satisfactory for a number of reasons, mainly because lasers significantly heat and burn the disc, oxidize the material and change the metallurgy of the metal. Therefore, according to this publication, it is impossible providing non-through cut on the disc through direct vaporization or ablation of the material, namely annulling or rendering irrelevant the material melting.

However, document PCT/US2009/059178 states that laboratory tests have shown that, when using laser scoring with an adequate selection of laser and process parameters, the heat-affected zone is narrow and the resolidified layer is of micron dimensions. Distortion is therefore negligible. According to this publication, various tests have shown that the heat-affected zone is of such small dimensions that it does not affect negatively the overall mechanical characteristics or performance of the disc for the range of commercial applications typical of a rupture disc device.

In particular, publication PCT/US2009/059178 teaches that it is possible to remove material from the rupture disc as vapor without melting or oxidizing disc material adjacent the removed material by selecting a wavelength of the laser beam within a range of between approximately 200 nanometers and approximately 1064 nanometers, by selecting a pulse repetition rate within a range of between approximately 2 kHz and approximately 10 kHz, by selecting a speed of relative motion between the laser and the rupture disc for each pass of the laser within a range of between approximately 10 mm/s and approximately 60 mm/s, by selecting a laser having a power within a range of between approximately 0.5 Watts and approximately 30 Watts and by selecting a focal spot diameter of the laser within a range of between approximately 20 μm and approximately 100 μm.

By using the above ranges for producing rupture discs the average score depth per pass is between 6 μm and 168 μm (depending on the actual combination of parameters).

The Applicant has noted that, in order to obtain a suitable rupture disc the total passes should be more than one, for example five. In fact, one pass only cannot guarantee the required depth uniformity throughout the entire frangible line.

It is to be noted that the above score depth per pass is unsuitable in case very thin discs have to be produced.

In fact, there is a need for producing rupture discs having thickness of about 20 μm with a total score depth of about 10 μm. Even taking into consideration the minimum score depth per pass of about 6 μm, five passes would result in 30 μm total score depth (clearly unsuitable for producing very thin discs).

Moreover, it is not always allowable (in terms of performance of the rupture disc) having resolidified layer of micron dimensions in the proximity of the non-through cut.

SUMMARY OF THE INVENTION

In this context, the aim of the present invention is to provide a method for production of a safety disc with pre-calculated breaking threshold that is devoid of the mentioned drawbacks.

In particular, it is an aim of the present invention to propose a method for production of safety discs with pre-calculated breaking threshold having thickness as low as about 20 μm.

It is a further aim of the present invention to propose a method for production of safety discs with pre-calculated breaking threshold having very insignificant resolidified layer in the proximity of the non-through cut.

The technical task mentioned and the aims specified are substantially achieved by a method for production of safety discs with a pre-calculated breaking threshold as set out in one or more of the appended claims.

Further features and advantages of the present invention will become more apparent from the detailed description of a preferred but not exclusive embodiment of a method for production of safety discs provided hereinafter.

BRIEF DESCRIPTION OF THE DRAWINGS

The present invention will become more fully understood from the detailed description given by way of non-limiting examples and the accompanying drawings, in which.

DETAILED DESCRIPTION OF THE PREFERRED EMBODIMENTS

With reference to the drawings, a safety disc made following a method in accordance with the invention has been generally identified with 1.

The safety disc 1 is mounted in pneumatic or hydraulic plants along safety ducts. In particular, the safety disc 1 fully closes the port of the duct onto which it is applied and comprises a first surface 1a and a second surface 1b. The fluid under pressure acts on one surface and the pressure of the external environment acts on the other.

Should the fluid acting on the first surface have a higher pressure than a threshold value, the safety disc 1 will open by tearing so as to enable transit of the fluid in the safety duct and allow discharge of an excess pressure into an external environment.

The safety disc 1 is a foil element, i.e. an element having a very thin thickness compared with its other two dimensions, on which at least one score or non-through cut 2 is formed in the foil element.

Figure 1:
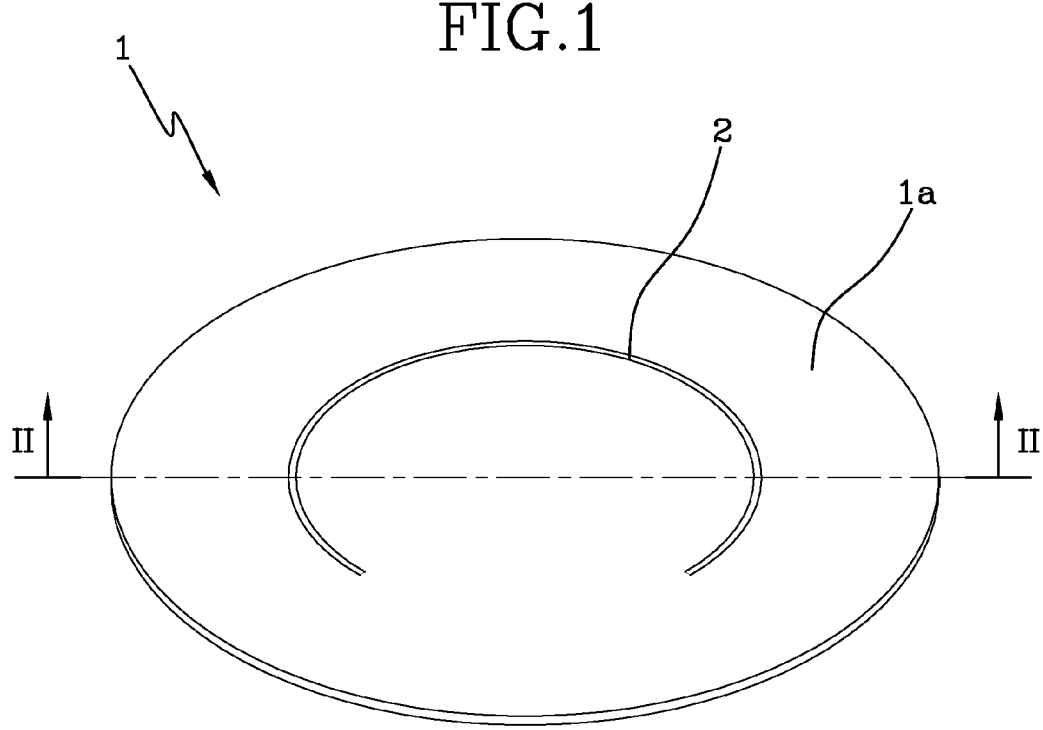
FIG. 1 is a perspective view of a safety disc made by a method in accordance with the present invention.

According to the embodiment of FIG. 1, the foil element is a planar disc that can have different shapes depending on the shape of the duct onto which it has to be applied.

According to another embodiment not shown in the figures, the foil element is a dome-shaped element that can have different shapes depending on the shape of the duct onto which it has to be applied. The domed rupture disc may be designed to burst at a specified pressure when pressure is applied on the concave side (forward acting or tension rupture disc) or may be designed to burst at a specified pressure when the pressure is applied on the convex side. This type of safety discs are known as "reverse type", since the breaking process starts with overturning of the convex portion. The safety disc of the reverse type is particularly adapted for use when the acting pressure varies in a cyclic manner because the cyclic stresses do not give rise to modifications in the crystalline-metallurgic structure, due to fatigue.

The safety disc 1 comprises at least one score or non-through cut 2 formed in a surface 1a along a working line.

In the described embodiments, the safety disc 1 comprises four scores or non-through cuts 2 of rectilinear shape disposed in an axially symmetric configuration. However, the number, shape and arrangement of the scores can vary depending on the operating requirements.

Disc 1 is preferably made of metal material, such as stainless steel, nickel, aluminium or other metals or particular metal alloys.

Alternatively, disc 1 can be made of graphite, plastic material, glass-ceramic materials.

According to the present invention, the cited scores or non-through cuts are obtained by a pulse laser acting directly on the surface of the foil element.

In particular, the scores are obtained by material removal through ablation. The ablation process is obtained by raising the temperature of the material above the material's boiling point at a very fast rate in order to directly vaporizing and thus removing the material without melting or oxidizing the surroundings region. Clearly such a process is an ideal process, namely the regions surrounding the removed material are, actually, melted and oxidized to some extent.

The non-through cuts of rupture discs should be obtained by reducing as much as possible the melted and oxidized region in the regions surrounding the scores.

As above stated, there are some publications stating that it is practically impossible to obtain feasible non-through cuts in rupture discs using a laser machining directly on the surface of the disc.

Other authors discovered and clarified that the capabilities and limitations of laser machining are dependant on the physical processes occurring in the laser beam interaction with the material. According to these authors, when using laser scoring the heat-affected zone is narrow and the resolidified layer is of micron dimensions; the score depth for each laser pass being comprised between 6 μm and 168 μm. This result seems to be the best one attainable.

The Applicant has surprisingly noted that the method of the present invention achieve better results with respect to the results attainable by the prior art methods.

Accordingly, the present invention provides a method for production of safety/rupture discs. The method comprises the step of providing a foil element, selecting a wavelength for a laser beam of a pulse laser within a range of between 800 nanometers and 1800 nanometers, selecting a pulse duration for the laser beam less than 10 nanosecond, preferably less than 1 nanosecond, and ablating at least one non-through cut 2 in the foil element by directly applying said laser beam to the foil element to remove material from the foil element thereby obtaining a safety/rupture disc.

Therefore, formation of non-through cuts or scores 2 takes place by applying the pulsed laser beam directly onto the foil element. In other words, the laser beam is directed against the foil element and a tiny portion of the same is removed by ablation or sublimation.

Preferably, the wavelength of the laser beam is included between 1030 and 1552 nanometers.

It is to be noted that prior art disclosures are silent on the pulse duration. The Applicant has found that the pulse duration is very important in performing laser machinery for producing rupture discs.

In one embodiment of the present invention, the pulse duration for the laser beam is within a range of between 0.9 picoseconds and 500 picoseconds. Preferably, the pulse duration is comprised between 1 and 50 picoseconds.

Laboratory tests using pulse duration of 6 picoseconds shown good results (as will be disclosed hereinafter). In these tests, the wavelength of the laser beam was 1030 nanometers.

In another embodiment of the present invention, the pulse duration for the laser beam is within a range of between 10 femtoseconds (namely $10*10^{-15}$ seconds) and 900 femtoseconds. Preferably, the pulse duration is comprised between 500 and 800 femtoseconds.

Laboratory tests using pulse duration of 800 femtoseconds have shown good results (as will be disclosed hereinafter). In these tests, the wavelength of the laser beam was 1552 nanometers.

The method of the present invention comprises the step of selecting a pulse repetition rate for the laser beam within a range of between 15 KHz and 800 KHz.

Preferably the pulse repetition rate is comprised between 50 KHz and 200 KHz.

The method further comprises the step of selecting a speed of relative motion between the laser beam and the foil element, namely the displacement speed of the laser beam along the foil element.

Preferably, the speed of relative motion between the laser beam and the foil element is within a range of between 0.07 m/s and 50 m/s.

The method further comprises of the step of selecting an energy value of each pulse of the laser beam.

Preferably, the energy value of each pulse of the laser beam is within a range of between 1 microJoule and 250 microJoule.

The power of the laser is included between 1 and 80 W, preferably between 1 and 40 W.

The above ranges and value are linked each other in order to minimizing the heat-affected zone on the foil element and minimizing the resolidified layer.

The score depth D for each laser pass is also a function of the selection of the above cited ranges and values. According to the above cited parameters, the score depth of each laser beam pass is within a range of between 0.005 μm and 5 μm.

Figure 2:
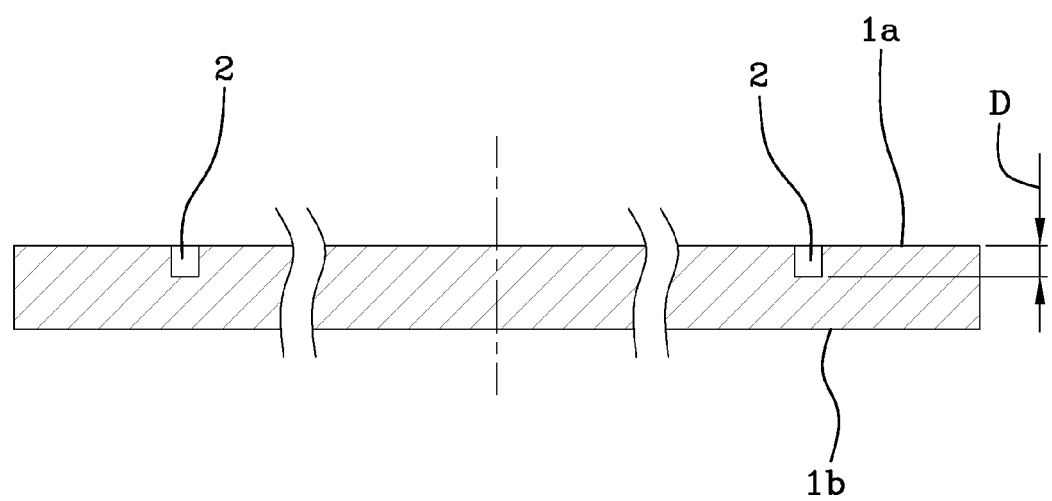
FIG. 2 represents a section view of the disc seen in FIG. 1 taken along line II-II.

FIG. 2 shows the score depth D, namely the depth of the score provided on the foil element.

In this connection, according to one embodiment of the present invention, the method comprises the step of providing a foil element, selecting a wavelength for a laser beam of a pulse laser within a range of between 800 nm and 1100 nm, selecting a pulse duration for the laser beam within a range of between 1 picoseconds and 100 picoseconds, and ablating at least one non-through cut 2 in the foil element by directly applying said laser beam to the foil element to remove material from the foil element thereby obtaining a safety/rupture disc.

The pulse repetition rate for the laser beam is comprised within a range of between 50 KHz and 200 KHz. The speed of relative motion between the laser beam and the foil element is comprised between 5 m/s and 50 m/s. The energy value of each pulse of the laser beam is comprised between 5 microJoule and 50 microJoule. The power of the laser is included between 5 and 30 W.

According to these parameters, the score depth of each laser beam pass is within a range of between 0.005 μm and 1 μm.

Moreover, the distance between a spot of the laser beam and the following spot, namely the distance between the centre of the spot of the beam of a pulse and the centre of the spot of the beam of the successive pulse, is comprised between 100 μm and 350 μm.

The following two examples have been performed according to the parameters selection of this embodiment.

Example 1

The Following Values should be Intended as Indicatives, Namely as Average Values within a Range of ±10%

Material of the foil element: stainless steel AISI 316L
Thickness of the foil element: 150 μm
Wavelength of the laser: 1030 nm
Power of the laser: 20 W
Pulse duration: 6 picoseconds
Energy value of each pulse: 25 microJoule
Pulse repetition rate: 100 KHz
Speed of relative motion: 25 m/s
Passes: 3000

The average depth of non-through cuts or scores for each pass is about 0.03 μm.

The total depth of the non-through cuts is about 95 μm.

The average pressure rupture of the safety disc is 11.9 barg (difference of pressure measured in bar between the two sides of the disc) with standard deviation of 0.46.

Distance between two spots: 160 μm

Example 2

The Following Values should be Intended as Indicatives, Namely as Average Values within a Range of ±10%

Material of the foil element: stainless steel AISI 316L
Thickness of the foil element: 20 μm
Wavelength of the laser: 1030 nm
Power of the laser: 20 W
Pulse duration: 6 picoseconds
Energy value of each pulse: 25 microJoule Pulse repetition rate: 100 KHz
Speed of relative motion: 25 m/s
Passes: 250
Distance between two spots: 250 μm The average depth of non-through cuts or scores for each pass is about 0.04 μm.

The total depth of the non-through cuts is about 10 μm. The average pressure rupture of the safety disc is 1.6 barg (difference of pressure measured in bar between the two sides of the disc) with standard deviation of 0.05.

According to another embodiment of the present invention, the method comprises the step of providing a foil element, selecting a wavelength for a laser beam of a pulse laser within a range of between 1000 nm and 1600 nm, selecting a pulse duration for the laser beam within a range of between 10 femtoseconds and 900 femtoseconds, and ablating at least one non-through cut 2 in the foil element by directly applying said laser beam to the foil element to remove material from the foil element thereby obtaining a safety/rupture disc.

The pulse repetition rate for the laser beam is comprised within a range of between 50 KHz and 450 KHz. The speed of relative motion between the laser beam and the foil element is comprised between 0.07 m/s and 3 m/s.

The energy value of each pulse of the laser beam is comprised between 5 microJoule and 50 microJoule.

The power of the laser is included between 0.5 and 10 W.

According to these parameters, the score depth of each laser beam pass is within a range of between 0.5 μm and 5 μm.

Moreover, the distance between a spot of the laser beam and the following spot, namely the distance between the centre of the spot of the beam of a pulse and the centre of the spot of the beam of the successive pulse, is comprised between 0.2 μm and 10 μm.

The following example has been performed according to the parameters selection of this embodiment.

Example 3

The Following Values should be Intended as Indicatives, Namely as Average Values within a Range of ±15%

Material of the foil element: stainless steel AISI 316L
Thickness of the foil element: 20 μm
Wavelength of the laser: 1552 nm
Power of the laser: 1.4 W
Pulse duration: 800 femtoseconds
Energy value of each pulse: 14 microJoule
Pulse repetition rate: 100 KHz
Speed of relative motion: 0.09 m/s
Passes: 6

The average depth of non-through cuts or scores for each pass is about 1.6 μm.

The total depth of the non-through cuts is about 10 μm. The average pressure rupture of the safety disc is 1.4 barg (difference of pressure measured in bar between the two sides of the disc) with standard deviation of 0.10.

Distance between two spots: 0.9 μm.

It has been noted that the resolidified layer on the bottom is less than one micron.

According to what above, the present method allows to obtain safety/rupture discs which cannot be obtained following the methods of laser machinery disclosed by the prior art.

According to other embodiments of the invention, the method has been implemented using graphite as the material of the foil element.

The following example has been performed according to the parameters selection of this embodiment.

Example 4

The Following Values should be Intended as Indicatives, Namely as Average Values within a Range of ±15%

Material of the foil element: graphite
Thickness of the foil element: 2 mm
Wavelength of the laser: 1064 nm
Power of the laser: 3.5 W
Pulse duration: 40 nanoseconds
Energy value of each pulse: 1.5 microJoule
Pulse repetition rate: 20 KHz
Speed of relative motion: 25 m/s
Passes: 80

The average pressure rupture of the safety disc is 0.55 barg (difference of pressure measured in bar between the two sides of the disc) with standard deviation of 0.01 (note that the average pressure rupture of the safety disc not treated is about 0.85 barg).

Moreover, in safety discs of the reverse type, a region of deformation initiation may be advantageously present. In fact, this type of disc is deformed before tearing by the excess pressure, until overturning of its concavity is caused. Only after this step, the safety disc opens by tearing.

The region of deformation initiation is preferably provided about a region of the central portion of the dome.

The creation of such region of deformation initiation is advantageously obtained by laser radiation as well by modification of the crystalline-metallurgic structure due to the thermal variation induced by the laser radiation.

An example of creation of the region of deformation has been conducted by applying the following parameters.

Example 5

The Following Values should be Intended as Indicatives, Namely as Average Values within a Range of ±15%

Material of the foil element: stainless steel AISI 316L
Dome height: 45 mm
Thickness of the foil element: 0.04 mm
Wavelength of the laser: 1030 nm
Power of the laser: 20 W
Pulse duration: 10 microseconds (10.000 nm)
Pulse repetition rate: 10 KHz
Speed of relative motion: 2 m/sec A circle of 5 mm diameter has been internally (i.e. totally) laser treated substantially without pass superposition The average overturning pressure of the safety disc is 0.48 barg (difference of pressure measured in bar between the two sides of the disc) with standard deviation of 0.01 (note that the average overturning pressure of the safety disc not treated is about 0.75 barg).

As various modifications could be made to the described embodiments without departing from the scope of the present invention, it is intended that all matter contained in the foregoing description shall be interpreted as illustrative rather than limiting. Thus, the scope of the present invention should not be limited by any of the above described examples of embodiments, but should be defined only in accordance with the following claims appended hereto and their equivalents.

What is claimed is:

1. A method for production of a safety/rupture disc, comprising the steps of:
   providing a foil element of metal material having a thickness within the range of between 15 μm and 800 μm;
   selecting a wavelength for a laser beam of a pulse laser within a range of between 800 nanometers and 1800 nanometers;
   selecting a pulse repetition rate for the laser beam within a range of between 15 KHz and 800 KHz;
   selecting a pulse duration for the laser beam within a range of between 10 femtoseconds and 900 femtoseconds and ablating at least one non-through cut in the metal material of the foil element by directly applying said laser beam to the foil element to remove part of the metal material from the foil element thereby obtaining the safety/rupture disc.

2. A method as in claim 1 comprising the step of selecting a speed of relative motion between the laser beam and the foil element.

3. A method as in claim 2 wherein said speed of relative motion between the laser beam and the foil element is within a range of between 0.07 m/s and 50 m/s.

4. A method as in claim 1 comprising the step of selecting an energy value of each pulse of the laser beam.

5. A method as in claim 4 wherein said energy value of each pulse of the laser beam is within a range of between 1 microJoule and 250 microJoule.

6. A method as in claim 1 wherein the score depth of each laser beam pass is within a range of between 0.005 μm and 5 μm.

7. A method as in claim 1 wherein the step of providing a foil element is carried out by providing a planar disc.

8. A method as in claim 1 wherein the step of providing a foil element is carried out by providing a dome-shaped element.

9. A method as in claim 1 wherein said foil element has a thickness within the range of between 20 μm and 100 μm.

* * * * *